US012596896B2

(12) United States Patent
Allaka

(10) Patent No.: US 12,596,896 B2
(45) Date of Patent: Apr. 7, 2026

(54) SYSTEM AND METHOD TO DETERMINE AND HIGHLIGHT DEFECTIVE LABELS

(71) Applicant: Hand Held Products, Inc., Charlotte, NC (US)

(72) Inventor: Praveen Allaka, Indian Land, SC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/631,980

(22) Filed: Apr. 10, 2024

(65) Prior Publication Data

US 2025/0322184 A1 Oct. 16, 2025

(51) Int. Cl.
*G06K 7/10* (2006.01)
*G06K 7/14* (2006.01)

(52) U.S. Cl.
CPC ....... *G06K 7/10366* (2013.01); *G06K 7/1413* (2013.01)

(58) Field of Classification Search
CPC .......................... G06K 7/10366; G06K 7/1413
USPC ......................................................... 235/451
See application file for complete search history.

(56) References Cited

U.S. PATENT DOCUMENTS 8,432,567 B2 4/2013 Eberhardt, Jr. et al.
10,867,145 B2 12/2020 Zhao et al.

2006/0221363 A1* 10/2006 Roth ................... G06K 7/10861
358/1.6
2009/0045261 A1* 2/2009 Pine ..................... G06K 7/0004
235/462.42
2011/0074900 A1* 3/2011 Ito ............................. B41J 3/01
347/107
2012/0048938 A1* 3/2012 He ..................... G06K 7/10722
235/462.13
2020/0202094 A1* 6/2020 D'Ercoli ............ G06K 7/10544
2021/0157997 A1* 5/2021 Brock .................. G06K 7/1413
2022/0189245 A1 6/2022 Shigeta

FOREIGN PATENT DOCUMENTS

EP 2530579 A1 12/2012
KR 10-2023-0121771 A 8/2023

* cited by examiner

*Primary Examiner* — Ahshik Kim
(74) *Attorney, Agent, or Firm* — Alston & Bird LLP

(57) ABSTRACT

A system is disclosed. The system comprises at least one reader configured to scan one or more labels and at least one processor communicatively coupled to the at least one reader. Further, the at least one processor is configured to determine a grade value or encoded information associated with each of the one or more labels based at least on the scanning, compare the determined grade value or the encoded information with a predefined threshold value associated with each of the one or more labels, and determine at least one defective label from the one or more labels, based at least on the comparison, and a light projector communicatively coupled to the at least one processor. Thereafter, the light projector is configured to project one or more light patterns over the at least one defective label to highlight the at least one defective label to a user.

16 Claims, 5 Drawing Sheets

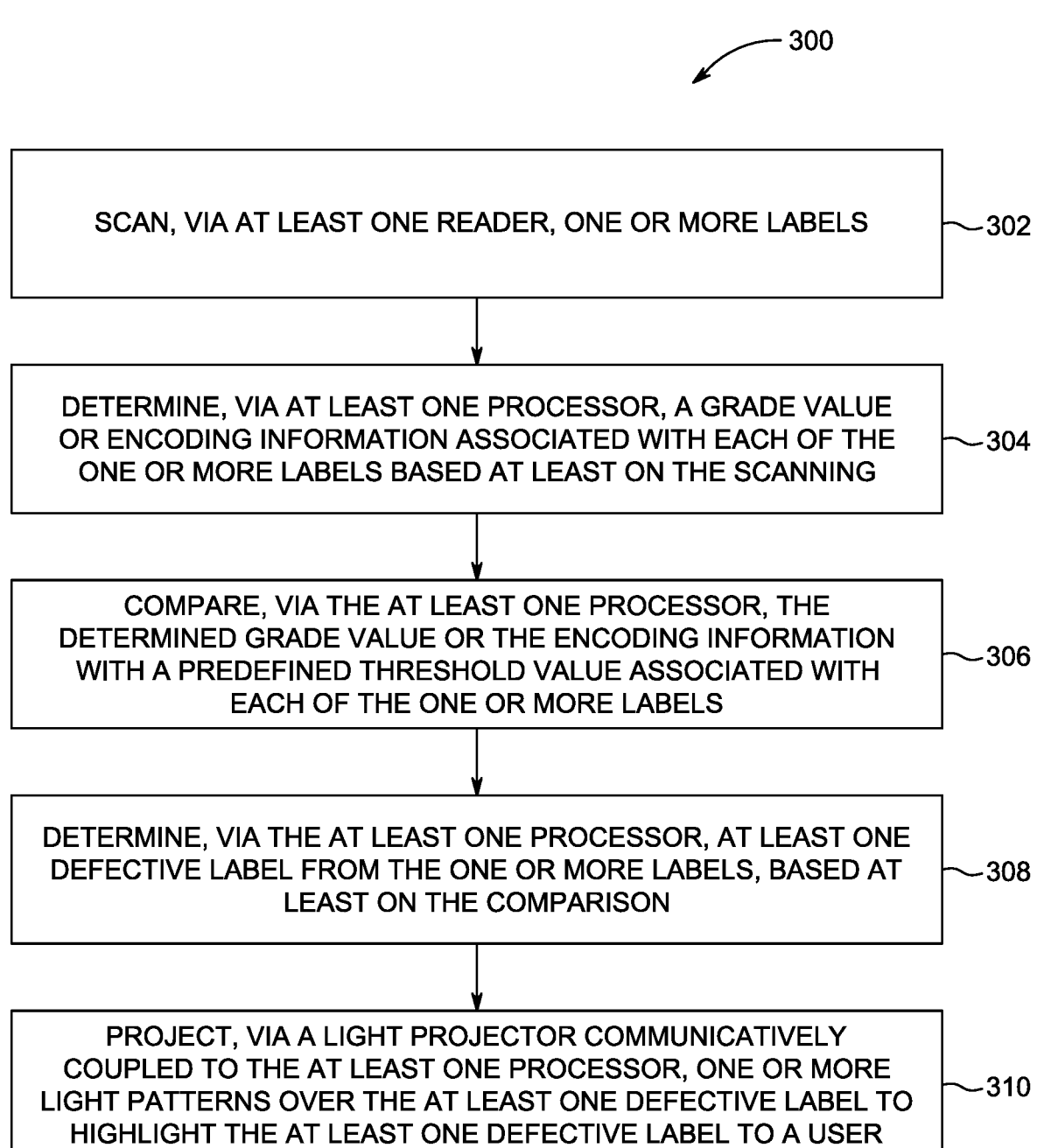

300

SCAN, VIA AT LEAST ONE READER, ONE OR MORE LABELS   302

DETERMINE, VIA AT LEAST ONE PROCESSOR, A GRADE VALUE OR ENCODING INFORMATION ASSOCIATED WITH EACH OF THE ONE OR MORE LABELS BASED AT LEAST ON THE SCANNING   304

COMPARE, VIA THE AT LEAST ONE PROCESSOR, THE DETERMINED GRADE VALUE OR THE ENCODING INFORMATION WITH A PREDEFINED THRESHOLD VALUE ASSOCIATED WITH EACH OF THE ONE OR MORE LABELS   306

DETERMINE, VIA THE AT LEAST ONE PROCESSOR, AT LEAST ONE DEFECTIVE LABEL FROM THE ONE OR MORE LABELS, BASED AT LEAST ON THE COMPARISON   308

PROJECT, VIA A LIGHT PROJECTOR COMMUNICATIVELY COUPLED TO THE AT LEAST ONE PROCESSOR, ONE OR MORE LIGHT PATTERNS OVER THE AT LEAST ONE DEFECTIVE LABEL TO HIGHLIGHT THE AT LEAST ONE DEFECTIVE LABEL TO A USER   310

FIG. 3

SYSTEM AND METHOD TO DETERMINE AND HIGHLIGHT DEFECTIVE LABELS

TECHNOLOGICAL FIELD

Example embodiments of the present disclosure relate generally to a label printer, and more particularly to a system and method to determine and highlight defective labels from the label printer.

BACKGROUND

Barcode and radio frequency identification (RFID) label printers are usually employed in efficient management of inventory and data. Label printers are sometimes configured to print machine readable symbology, such as a barcode or a quick response (QR) code, on a label by utilizing thermal or laser techniques. Additionally, or alternatively, label printers are sometimes configured to encode a chip within an RFID label. The label printers may encode information on the chip such as product details or tracking numbers. Such label printers are essential for inventory control, package tracking, and space management. In some scenarios, the printed machine-readable symbology may be of low quality and may not meet verification standards. For example, the printed machine-readable symbology may not be dark enough, the background may be too dark, there may be local variations in contrast, there may be defects, such as printing irregularities or distortions, etc. In some scenarios, the chip, when included, may fail to properly encode and may not meet verification standards. Because label printers are often used in busy warehouses that require a large amount of labels to be created in a short time period, the user of conventional label printers may not realize that the printed machine-readable symbology and/or the encoding of the chip has not met verification standards.

Applicant has identified a number of deficiencies and problems, and through applied effort, ingenuity, and innovation, many of these identified problems have been solved by developing solutions that are included in embodiments of the present disclosure, many examples of which are described in detail herein.

BRIEF SUMMARY

The following presents a simplified summary to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a system is disclosed. The system comprises at least one reader configured to scan one or more labels and at least one processor is communicatively coupled to the at least one reader. Further, the at least one processor is configured to determine a grade value or encoded information associated with each of the one or more labels based at least on the scanning, compare the determined grade value or the encoded information with a predefined threshold value associated with each of the one or more labels, and determine at least one defective label from the one or more labels, based at least on the comparison. Further, a light projector is communicatively coupled to the at least one processor. Thereafter, the light projector is configured to project one or more light patterns over the at least one defective label to highlight the at least one defective label to a user in realtime barcode printing and RFID encoding.

In some embodiments, the one or more labels corresponds to machine-readable symbology labels or one or more radio frequency identification (RFID) labels. In some embodiments, the grade value corresponds to a quality of each of the one or more labels based at least on a minimum reflectance, edge contrast, modulation, decode checks, defects, or decodability. In some embodiments, the grade value is assigned between a scale of A-F, where A corresponds to a higher grade and F corresponds to a lower grade.

In some embodiments, upon determining the grade value of each label below the predefined threshold value associated with the grade value of each label, the at least one processor classifies at least one label from the one or more labels as the at least one defective label. In some embodiments, upon determining the encoded information of each label is mismatched with a predefined threshold value associated with the encoded information of each label, the at least one processor classifies at least one label from the one or more labels as the at least one defective label.

In some embodiments, the one or more light patterns projected by the light projector reflects the determined grade value of the one or more labels or symbols signifying the at least one defective label. In some embodiments, the at least one light projector corresponds to at least one red green blue (RGB) light emitting diodes (LEDs) strip. In some embodiments, the at least one RGB LED strip is configured to adjust in at least one of a vertical direction or in a horizontal direction to project the one or more light patterns over the one or more labels of various shapes and size. In some embodiments, the at least one reader corresponds to at least one radio frequency identification (RFID) reader.

In another example embodiment, a method is disclosed. The method comprises scanning, via at least one reader, one or more labels. The method further comprises determining, via at least one processor, a grade value or encoded information associated with each of the one or more labels based at least on the scanning. Further, the method comprises comparing, via the at least one processor, the determined grade value or the encoded information with a predefined threshold value associated with each of the one or more labels. The method further comprises determining, via the at least one processor, at least one defective label from the one or more labels, based at least on the comparison. Thereafter, the method comprises projecting, via a light projector communicatively coupled to the at least one processor, one or more light patterns over the at least one defective label to highlight the at least one defective label to a user.

In another example embodiment, a printer is disclosed. The printer comprises a printer assembly for printing one or more labels. The printer comprises at least one reader coupled, directly or indirectly, to the printer assembly, the at least one reader is configured to scan one or more labels that are printed by the printer assembly to determine whether any of the one or more labels are defective, and a light projector coupled, directly or indirectly, to the printer assembly, the light projector is configured to project one or more light patterns over the at least one defective label of the one or more labels.

The above summary is provided merely for purposes of summarizing some exemplary embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

Figure 1:
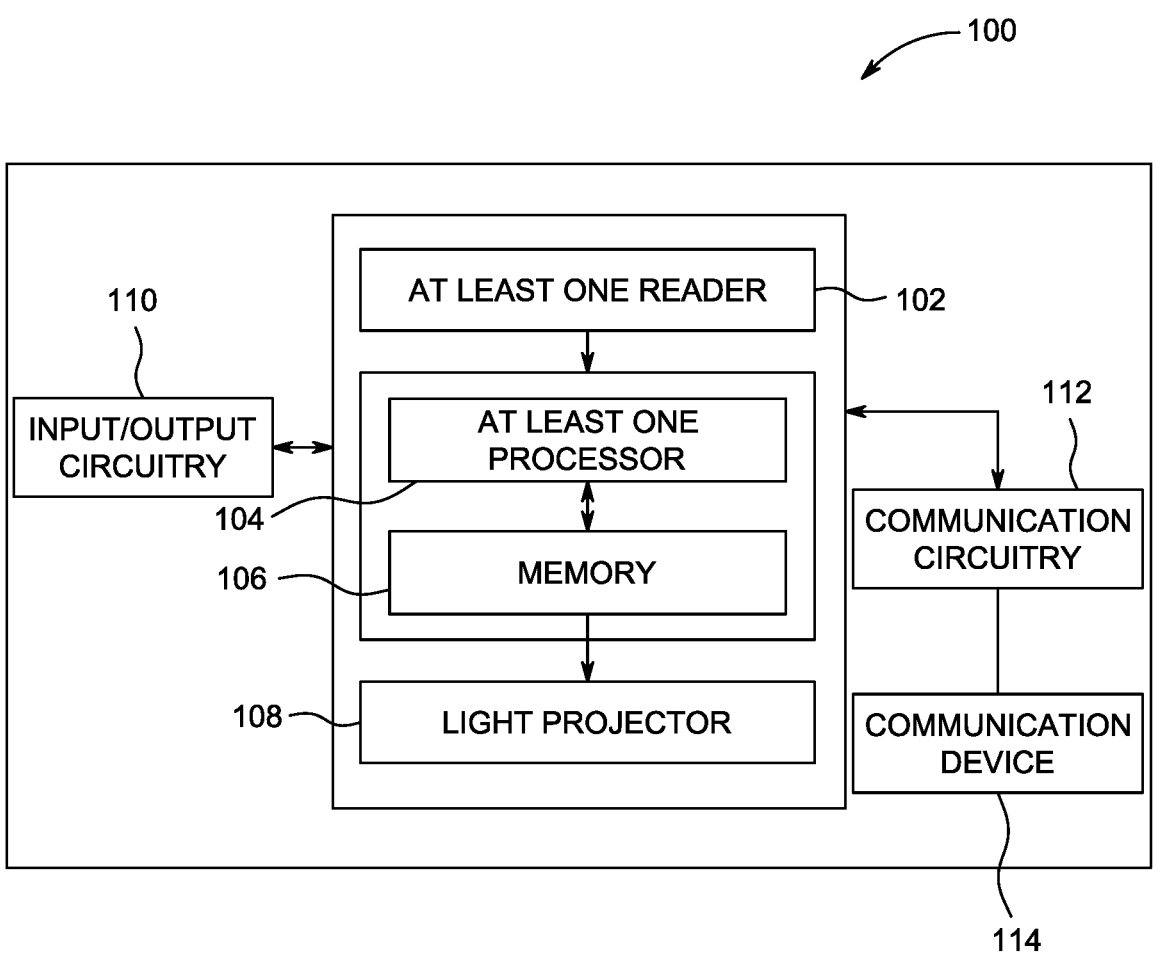
Figure 2:
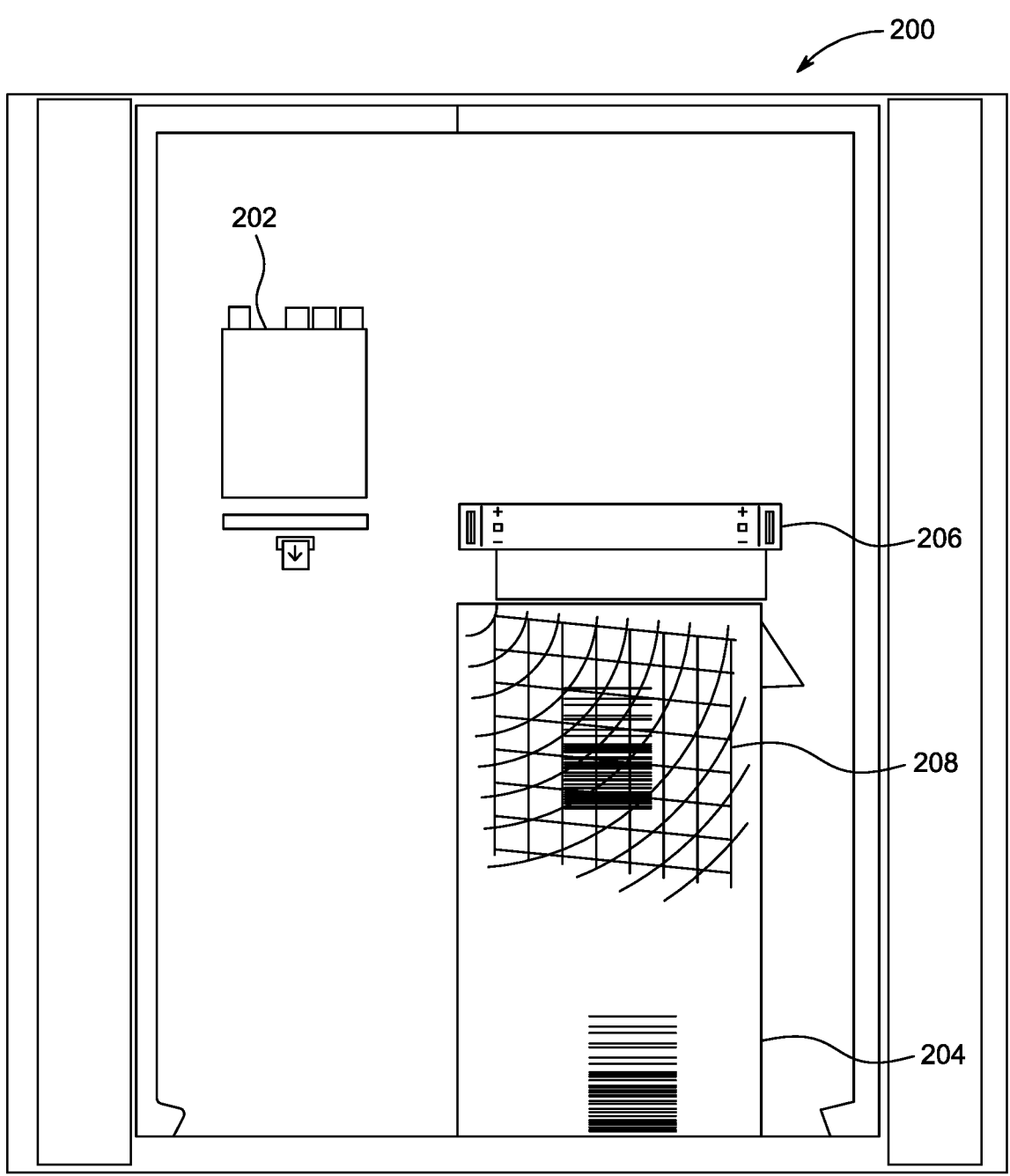
Figure 4:
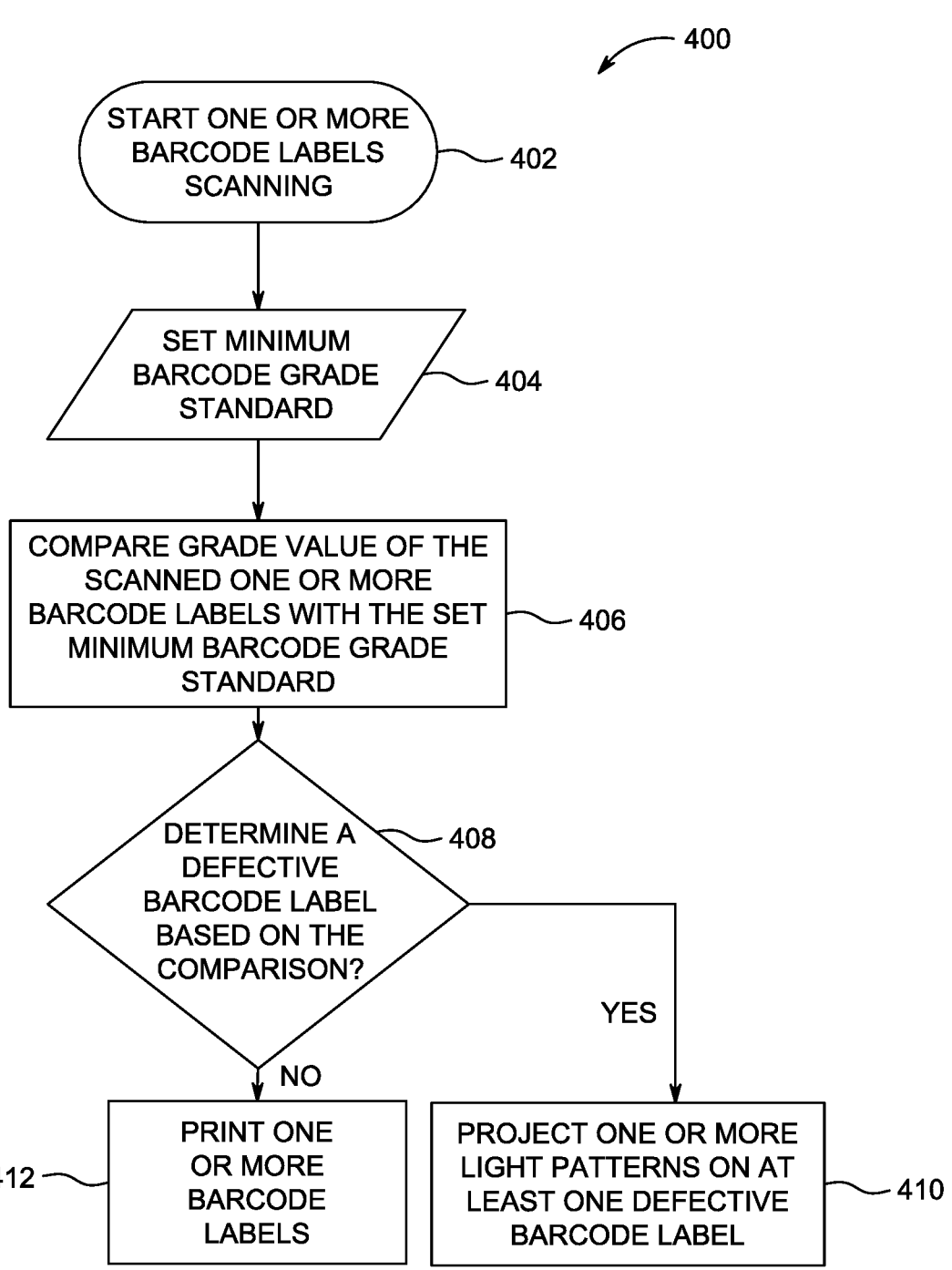
Figure 5:
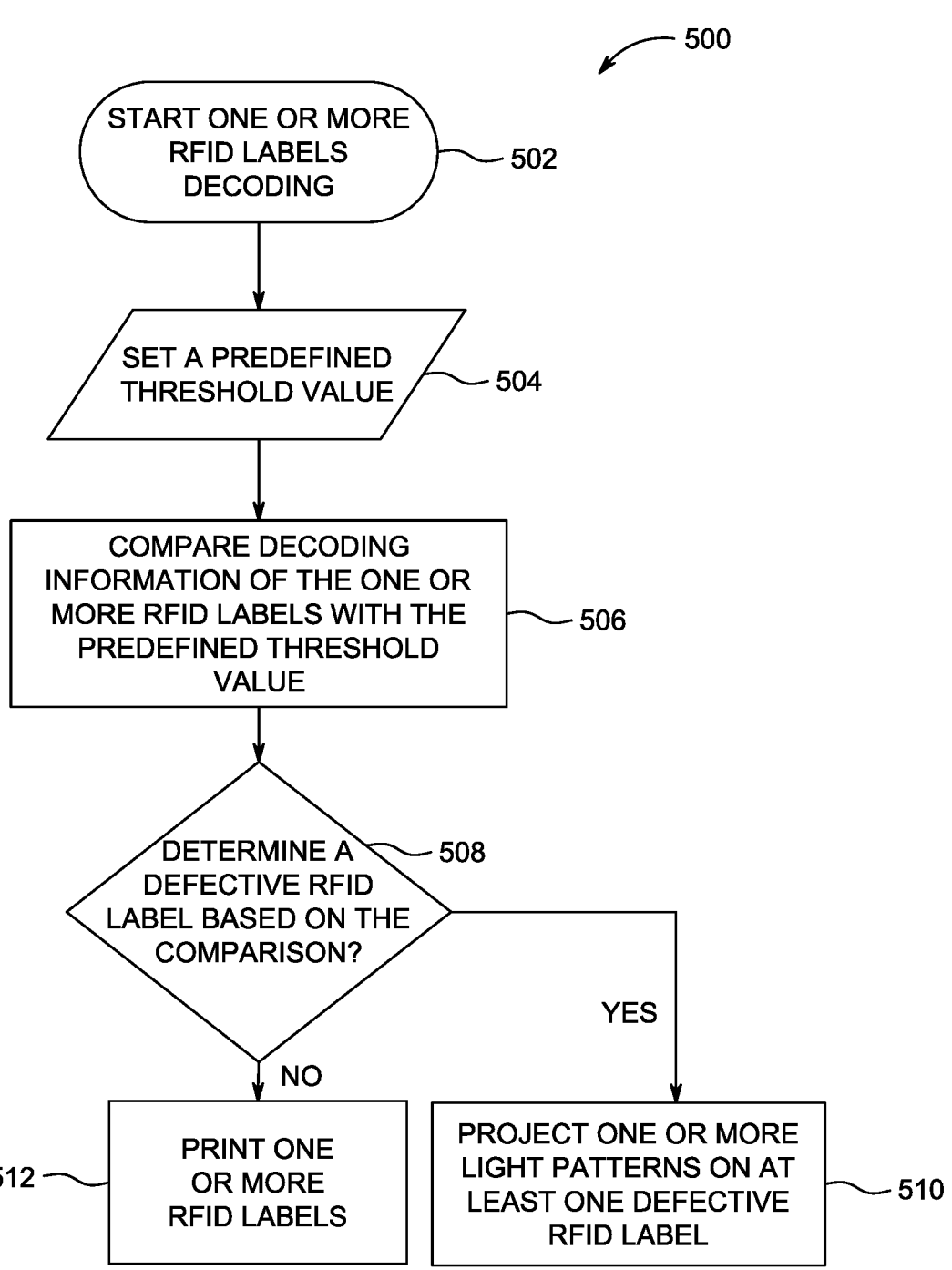

Having thus described certain example embodiments of the present disclosure in general terms, reference will hereinafter be made to the accompanying drawings, which are not necessarily drawn to scale, and wherein:

FIG. 1 illustrates a block diagram of a system operationally coupled with a printer in accordance with an example embodiment of the present disclosure;

FIG. 2 illustrates a front view of the printer, in accordance with an example embodiment of the present disclosure;

FIG. 3 a flowchart of a method to determine the at least one defective label in accordance with an example embodiment of the present disclosure;

FIG. 4 illustrates a flowchart of a method to determine at least one defective barcode label in accordance with an example embodiment of the present disclosure; and FIG. 5 illustrates a flowchart of a method to determine at least one defective RFID label in accordance with an example embodiment of the present disclosure.

DETAILED DESCRIPTION

The exemplary embodiments described herein provide detail for illustrative purposes and are subject to many variations in structure and design. It should be appreciated, however, that the embodiments are not limited to a particularly disclosed embodiment shown or described. It is understood that various omissions and substitutions of equivalents are contemplated as circumstances may suggest or render expedient, but these are intended to cover the application or implementation without departing from the spirit or scope of the claims.

Also, it is to be understood that the phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Like numerals represent like parts in the figures.

Embodiments of the present disclosure will be described more fully hereinafter with reference to the accompanying drawings in which like numerals represent like elements throughout the several figures, and in which example embodiments are shown. Embodiments of the present disclosure may, however, be embodied in alternative forms and should not be construed as being limited to the embodiments set forth herein. The examples set forth herein are non-limiting examples and are merely examples among other possible examples.

The present disclosure provides various embodiments of a system and method to determine and highlight defective labels. Embodiments may be configured to scan, or acquire an image of, one or more labels printed by a printer in a real-time. Embodiments may be configured to determine a grade value for the printed label, compare an image of the printed label to a reference image, or compare date encoded in a printed barcode or programmed RFID label with the information intended to be printed upon or encoded into each of the one or more labels. Embodiments may be configured to compare the determined grade value or encoded information with a predefined threshold value or the data that was intended to be encoded in the contents of the label or RFID label. Embodiments may be configured to determine at least one defective label from the one or more labels. Embodiments may be configured to highlight the at least one defective label to a user.

FIG. 1 illustrates a block diagram of a system 100, in accordance with an example embodiment of the present disclosure. The system 100 may comprise at least one reader 102 configured to scan the one or more labels (not shown), at least one processor 104, a memory 106, a light projector 108, an input/output circuitry 110, and a communication circuitry 112.

In some embodiments, the system 100 may correspond to a printer. The printer may be configured to print the one or more labels in real time. In some embodiments, the printer may comprise a printer assembly. Further, the printer assembly may comprise one or more paper rolls, at least one ink cartridge, a printhead and one or more motorized actuators. In some embodiments, the printer may be communicatively coupled with a communication device 114 through the input/output circuitry 110 or the communication circuitry 112. In some embodiments, upon receiving a print command from the communication device 114, the one or more motorized actuators provides an omnidirectional movement to the printhead while performing a printing operation. In some embodiments, the printer may be configured to print the one or more labels. Further, the one or more labels may correspond to machine-readable symbology labels or one or more radio frequency identification (RFID) labels. In some embodiments, the machine-readable symbology labels may comprise at least one of one or more barcode labels and one or more Quick Response (QR) code labels.

In some embodiments, the at least one reader 102 may correspond to at least one barcode reader, at least one QR code reader, or at least one radio frequency identification (RFID) reader. In one embodiment, the at least one reader 102 may be configured to scan the one or more labels that may be printed in real time. In some embodiments, when the at least one reader 102 correspond to the at least one barcode reader or the at least one QR code reader, the at least one reader 102 may comprise a light source (not shown), a linear image sensor or two-dimensional (2D) image sensor (not shown), and an analog to digital converter (ADC). In some embodiments, the light source may correspond to a laser emitter or spectrophotometer that may be configured to emit a laser for enhancing readability of grading status or RFID encoding status with one or more labels printed by the printer in the real time.

In an exemplary embodiment, the at least one reader 102 may be configured to scan the one or more barcode labels. The at least one reader 102 scans an array of scan lines printed on the one or more barcode labels, using the linear image sensor or two-dimensional (2D) image sensor. In another exemplary embodiment, when the at least one reader 102 may be configured to scan the one or more QR code labels. The at least one reader 102 scans the pattern of pixels printed by the printer in real-time, using the linear image sensor or two-dimensional (2D) image sensor. In some embodiments, the linear image sensor or two-dimensional (2D) image sensor may be configured to detect the light reflected from the array of scan lines of the one or more barcode labels or the pattern of pixels of the one or more QR code labels.

In some embodiments, the analog to digital converter may be paired with the linear image sensor or two-dimensional (2D) image sensor for converting analog data corresponding to an intensity of the reflected light, conceived by the linear image sensor or two-dimensional (2D) image sensor into one or more analog to digital converter (ADC) signals. In another embodiment, when the at least one reader 102 corresponds to the at least one RFID reader, the at least one reader 102 may comprise an antenna, a transceiver and a control unit. Further, the at least one reader 102 may be configured to transmits one or more signals having radio frequency towards one or more RFID labels printed by the printer using the antenna and the transceiver. In some embodiments, the at least one reader 102 may be configured to fetch an encoded information from the one or more RFID labels using the transceiver and the control unit.

In some embodiments, the at least one processor 104 may be communicatively coupled to the at least one reader 102. In some embodiments, the at least one processor 104 may include suitable logic, circuitry, and/or interfaces that are operable to execute one or more instructions stored in a memory to perform predetermined operations. In one embodiment, the at least one processor 104 may be configured to decode and execute any instructions received from one or more other electronic devices or server(s). The at least one processor 104 may be configured to execute one or more computer-readable program instructions, such as program instructions to carry out any of the functions described in this description. Further, the at least one processor 104 may be implemented using one or more processor technologies known in the art. Examples of the at least one processor 104 include, but are not limited to, one or more general purpose processors and/or one or more special purpose processors.

Further, the at least one processor 104 may be configured to receive the one or more ADC signals or the encoded information. In some embodiments, the one or more ADC signals or encoded information may be configured to provide data corresponding to the information printed on the one or more labels. In some embodiments, the at least one processor 104 may be configured to process the data of each of the one or more labels received from the at least one reader 102. In some embodiments, the at least one processor 104 may be configured to determine a grade value associated with each of the one or more labels based at least on the scanning. In some embodiments, the at least one processor 104 may be configured to determine the encoded information associated with each of the one or more labels, based at least on the scanning.

In some embodiments, the grade value may be assigned between a scale of "A to F". In some embodiments, the "F" grade value may correspond to a lower graded label of the one or more labels and the "A" grade value may correspond to a higher graded label of the one or more labels. In some embodiments, the at least one processor 104 may be configured to determine the grade value of the one or more labels, based at least on quality of the one or more printed labels. In some embodiments, the quality of the one or more labels scanned by the at least one reader 102 may be determined by the at least one processor 104 using at least a barcode verification standard (e.g., International Organization for Standardization (ISO) 15416 or ISO 15415). In some embodiments, the ISO 15416 may comprise a minimum reflectance, edge contrast, modulation, decode, defects or decodability. In some embodiments, the ISO 15415 may comprise at least one of symbol contrast, modulation, fixed pattern damage, axial non-uniformity or grid non-uniformity.

In some embodiments, the minimum reflectance corresponds to one or more bars printed within the one or more labels are dark enough to meet a required ratio of light that may be reflected off one or more spaces present on the one or more labels. In some embodiments, the edge contrast may correspond to a difference between adjacent bars and spaces printed on the one or more labels. Further, the modulation may refer to local variation in contrast. In some embodiments, the decode corresponds to the one or more labels are readable using at least one standard reference decode technique. In some embodiments, the defects may comprise printing errors, dirt or markings that may affect one single bar or space. In some embodiments, the decodability may grade the accuracy of bar and space widths compared to their ideal size. In some embodiments, each of the one or more labels having bar width growth or distortion may count as a low decodability grade.

In some embodiments, the symbol contrast may refer to a difference between the darkest and the lightest modules. In some embodiments, the modulation may refer to measurement of local variations in contrast of the one or more labels. In some embodiments, the fixed pattern damage comprises errors with the L sides or clock pattern or quite zone of the bars and spaces printed on the one or more labels. In some embodiments, the axial non-uniformity may refer to the uneven scaling of the bars and spaces printed on the one or more labels. In some embodiments, the grid non-uniformity may refer to measurement of biggest deviation from the grid of the barcodes printed on the one or more labels.

In some embodiments, the at least one processor 104 may be configured to compare the grade value with a predefined threshold value associated with each of the one or more labels. In some embodiments, the at least one processor 104 may be configured to determine at least one defective label from the one or more labels, based at least one the comparison. Further, upon determining the grade value of each label below the predefined threshold value associated with the grade value of each label, the at least one processor 104 may be configured to classify at least one label from the one or more labels as the at least one defective label.

In some embodiments, when the label includes an RFID chip, the at least one processor 104 may be configured to compare the encoded information with a predefined threshold value associated with each of the one or more labels. In some embodiments, the at least one processor 104 may be configured to determine at least one defective label from the one or more labels, based at least one the comparison. Further, upon determining the encoded information of each label is mismatched with a predefined threshold value associated with the encoded information of each label, the at least one processor 104 may classify at least one label from the one or more labels as the at least one defective label.

Further, the memory 106 may be communicatively coupled to the at least one processor 104. Further, the memory 106 may be configured to store a set of instructions and data executed by the at least one processor 104. Further, the memory 106 may include the one or more instructions that are executable by the at least one processor 104 to perform specific operations. It is apparent to a skilled artisan that the one or more instructions stored in the memory 106 enable the hardware of the system 100 to perform the predetermined operations. Some of the commonly known memory 106 implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

In some embodiments, the system 100 may further comprise the light projector 108. In some embodiments the at least one processor 104 may be communicatively coupled with the light projector 108. In some embodiments, the at least one processor 104 may be configured to provide one or more input signals to the light projector 108. In some embodiments, the at least one light projector 108 may be configured to project one or more light patterns over the at least one defective label to highlight the at least one defective label to a user. In some embodiments, the one or more light patterns may be customizable by a user. In some embodiments, the one or more light patterns comprises crisscross pattern, vertical line pattern, horizontal line pattern, cross pattern, textual pattern (e.g., a notification displaying "ERROR"), etc.

As illustrated in FIG. 1, the system 100 may comprise the input/output circuitry 110 that enables the user to communicate or interface with the system 100 via the communication device 114. It may be noted that the input/output circuitry 110 may act as a medium to transmit input from the communication device 114 to and from the system 100. In some embodiments, the input/output circuitry 110 may refer to the hardware and software components that facilitate the exchange of information between the user and the system 100. The input/output circuitry 110 may include various input devices such as keyboards, barcode scanners, GUI for the user to provide data and various output devices such as displays, printers for the user to receive data.

In one example, the communication device 114 may include N number of user devices. In some embodiments, the communication device 114 may include a graphical user interface (GUI) (not shown) as input circuitry to allow the user to input data. In some embodiments, the communication device 114 may comprise at least one of one or more mobile phones, laptops, or like. In some embodiments, the communication circuitry 112 may allow the system 100 and the communication device 114 to exchange data or information with other system 100 or apparatuses. Further, the system 100 may be communicatively coupled with a network interface via one or more protocols and software modules for sending and receiving data or information. In some embodiments, the communication circuitry 112 may include Ethernet ports, Wi-Fi adapters, or communication protocols for connecting with other systems. The communication circuitry 112 may allow the system 100 to stay up-to-date.

It will be apparent to one skilled in the art that above-mentioned components of the system 100 have been provided only for illustration purposes, without departing from the scope of the disclosure.

FIG. 2 illustrates a front view of a printer 200 for printing the one or more labels, in accordance with an example embodiment of the present disclosure. FIG. 2 is described in conjunction with FIG. 1.

In some embodiments, the printer 200 may be installed with at least one display 202 that may be accessed by the user to upload the details that may be printed on one or more labels 204. In some embodiments, the at least one display 202 may be accessed by the user to input details regarding the shape and size of the one or more labels 204. In an exemplary embodiment, the at least one display 202 may be configured to show an alert message regarding the at least one defective label in the real-time. In one embodiment, the at least one display 202 may be integrated on the printer 200. In another embodiment, the at least one display 202 may be wirelessly paired with the printer 200 via the input/output circuitry 110 or the communication circuitry 112. In an exemplary embodiment, after identifying the at least one defective label, the at least one processor 104 may transmit the alert message to the communication device 114 in order to notify the user regarding the at least one defective label in real time.

In some embodiments, the printer 200 may be communicatively paired with the communication device 114 through the input/output circuitry 110 or the communication circuitry 112. Further, the communication device 114 may be accessed by the user to input the printing details and upload the details to the memory 106. In some embodiments, the printing details may be encoded in the form of a string of numbers. In some embodiments, the printing details may be fetched by the at least one processor 104 from the memory 106. In some embodiments, the at least one processor 104 may direct the one or more motorized actuators for providing movement to the print head to print the encoded details on the one or more labels 204. In one embodiment, the one or more labels 204 may correspond to the one or more barcode labels having the array of scan lines. In one embodiment, the one or more labels 204 may correspond to the one or more QR code labels having the pattern of pixels. In another embodiment, the one or more labels 204 may correspond to the one or more RFID labels. Further, the one or more RFID labels may comprise an antenna and a memory component.

In some embodiments, as described earlier, the at least one processor 104 may be configured to determine at least one defective label from the one or more labels. In some embodiments, upon detecting the at least one defective label, the at least one processor 104 may be configured to actuate a light projector 206. As illustrated in FIG. 2, the light projector 206 may comprise at least one light source (not shown) and one or more light scattering medium (not shown). In some embodiments, the at least one light source may be configured to illuminate one or more light patterns 208 each having a predefined threshold intensity, over the at least one defective label. Further, the one or more light scattering medium may be configured to scatter the one or more light patterns 208 over the at least one defective label to highlight the at least one defective label to the user.

In some embodiments, the light projector 206 may correspond to at least one red green blue (RGB) light emitting diodes (LEDs) strip. In some embodiments the at least one RGB LED strip may be configured to illuminate the one or more light patterns 208 in at least one of a red color, green color, or blue color. In some embodiments, the one or more light patterns 208 may comprise crisscross pattern, vertical line pattern, horizontal line pattern, cross pattern, textual pattern, etc. In some embodiments, the at least one RGB LED strip may be configured to adjust in at least one of a vertical direction or in a horizontal direction to project the one or more light patterns 208 over the one or more labels 204 of various shapes and size. In at least one example, based upon a width of the one or more labels 204, the at least one one processor may direct the light projector 206 to adjust horizontally to adjust based on the width of the one or more labels 204 to project the one or more light patterns 208 over the one or more labels 204.

FIG. 3 a flowchart of a method 300 to determine the at least one defective label, in accordance with an example embodiment of the present disclosure. FIG. 3 is described in conjunction with FIGS. 1-2.

At operation 302, the one or more labels 204 may be scanned by the at least one reader 102. In some embodiments, the printer 200 having the printer assembly may be configured to print the one or more labels 204. In some embodiment, the at least one reader 102 may correspond to at least one of the at least one barcode reader, the at least one QR code reader, or the at least one RFID reader. Further, the at least one reader 102 may be configured to scan the one or more labels 204 in the real-time. For example, a barcode printer is configured to print one or more barcode labels. Further, at least one reader 102 is coupled with the barcode printer to scan the one or more barcode labels in a real-time.

At operation 304, the at least one processor 104 may be configured to determine a grade value or encoded information associated with each of the one or more labels 204, based at least on the scanning. Further, the grade value may be assigned between the scale of "A to F". In some embodiments, the "F" grade value may correspond to a lower graded label of the one or more labels 204 and the "A" grade value may correspond to a higher graded label of the one or more labels 204. In some embodiments, the at least one processor 104 may be configured to determine the grade value of the one or more labels 204. For example, at least one processor 104 is coupled with the at least one reader 102 for determining a grade value of the one or more labels 204 scanned by the at least one reader 102. The at least one processor 104 determines a "E" grade value to at least one label of the one or more labels 204, based at least on the scanning.

At operation 306, the determined grade value or the encoded information may be compared with the predefined threshold value associated with each of the one or more labels 204 by the at least one processor 104. Further, the grade value of the one or more labels 204 may corresponds to a quality of each of the one or more labels 204 based at least on a minimum reflectance, edge contrast, modulation, decode checks, defects, or decodability. For example, the at least one processor 104 compares the determined "E" grade value of the at least one of the one or more labels 204 with a predefined threshold value. Further, the Predefined threshold value may correspond to a "D" grade value.

At operation 308, the at least one defective label may be determined from the one or more labels 204 by the at least one processor 104, based at least on the comparison. In one embodiment, the at least one processor 104 may be configured to classify at least one label from the one or more labels 204 as the at least one defective label, upon determining the grade value of each label below a predefined threshold value associated with the grade value of each label. In another embodiment, the at least one processor 104 may be configured to classify the at least one label from the one or more labels 204 as the at least one defective label, upon determining the encoded information of each label is mismatching with a predefined threshold value associated with the encoded information of each label. For example, the at least one processor 104 classifies the at least one label having "E" grade value as at least one defective label, based at least on the comparison.

At operation 310, the light projector 108 may be configured to project the one or more light patterns 208 over the at least one defective label to highlight the at least one defective label to the user. In some embodiments, the light projector 108 may be communicatively coupled to the at least one processor 104. Further, the light projector 108 may correspond to the at least one red green blue (RGB) light emitting diodes (LEDs) strip that may be configured to project the one or more light patterns 208 over the at least one defective label. For example, a light projector 108 is installed on the printed for projecting a red colored laser beam with a cross marking on the at least one defective label to highlight the at least one defective label to the user.

FIG. 4 illustrates a flowchart of a method 400 to determine at least one defective barcode label, in accordance with an example embodiment of the present disclosure. FIG. 4 is described in conjunction with FIGS. 1-3.

At operation 402, the at least one reader 102 may be configured to scan the one or more barcode labels in real time, as explained at operation 302. In some embodiments, the at least one reader 102 may correspond to at least one barcode reader. The at least one processor 104 may be configured to allocate a grade value to each of the one or more barcode labels based on the scanning. For example, the grade value referred while allocating the grade value is on a scale of "A to F". Further, the at least one processor 104 may allocate an "A" grade to the at least one high quality graded label from the one or more scanned labels.

At operation 404, the at least one processor 104 may be configured to set a minimum barcode grade standard for the one or more printed barcode labels. The minimum barcode grade standard may correspond to at least one barcode verification standard (e.g., ISO 15416 or ISO 15415). For example, the at least one processor 104 may allocate an "B" as a threshold grade value or a minimum barcode grade standard.

At operation 406, the at least one processor 104 may be configured to compare the determined grade value of the one or more barcode labels with the set minimum barcode grade standard. In some embodiments, the at least one processor 104 may be configured to compare the grade value with the predefined threshold value. Further, the at least one processor 104 may be configured to determine the barcode verification results, based at least on the comparison. For example, the at least one processor 104 compares the allocated grade value of "A" with the threshold grade value of "B".

At operation 408, the at least one processor 104 may be configured to determine the defective label based on the comparison. In some embodiments, upon detecting the defective label, the at least one processor 104 may be configured to direct to step 410. Further, upon not detecting the defective label, the at least one processor 104 may direct to step 412 to print the one or more barcode labels.

Further, at operation 410, the light projector 108 may be configured to project the one or more light patterns 208 on the at least one defective barcode label, as explained at operation 310. Further, the light projector 108 may correspond to at least one RGB LED strip. Successively, at operation 412, the printer may be configured to continue printing the one or more barcode labels, when the at least one defective label is not detected by the at least one processor 104. Thereafter, the at least one processor 104 stops/halts the verification process of the one or more printed labels only after successful printing of the one or more labels 204.

FIG. 5 illustrates a flowchart of a method 500 to determine at least one defective RFID label, in accordance with an example embodiment of the present disclosure. FIG. 5 is described in conjunction with FIGS. 1-4.

At operation 502, the at least one reader 102 may be configured to determine encoded information of the RFID label by decoding the RFID label, as explained at operation 302 and 402. In some embodiments, the at least one reader 102 may correspond to at least one RFID reader. For example, the decoding is performed by the at least one RFID reader by emitting one or more RFID signals on the printed one or more RFID labels to determine the encoded information from the RFID label.

At operation 504, the at least one processor 104 may be configured to set a predefined threshold value for the RFID labels. Further, at operation 506, the at least one processor 104 may be configured to compare the encoded information with the predefined threshold value associated to the RFID labels. Further, at operation 508, the at least one processor 104 may be configured to determine a defective label based on the comparison. In some embodiments, upon detecting the defective labels, the at least one processor 104 may be configured to direct at step 510. Further, upon not detecting the defective RFID, the at least one processor may be configured to direct at step 512 to print the one or more RFID labels.

At operation 510, the light projector 108 may be configured to project the one or more light patterns 208 on the at least one defective RFID label, as explained at operation 310. Further, the light projector 108 may correspond to at least one RGB LED strip. Successively, at operation 512, the printer may be configured to continue printing the one or more RFID labels, when the at least one defective label is not detected by the at least one processor 104. Thereafter, the at least one processor 104 stops/halts the encoding process of the one or more printed RFID labels only after successful printing of the one or more RFID labels.

The present disclosure provides various embodiments to determine the at least one defective label from the one or more labels 204. Embodiments may be configured to enhance accuracy and precision of the printer. Embodiments may be configured to distinguish the at least one defective label from the one or more labels 204 by allocating the grade value to the one or more labels 204. Embodiments may be configured to highlight the at least one defective label to the user by projecting the one or more light signals on the at least one defective label. Embodiments may ensure proper usage of the resources and energy. Embodiments may prevent utilization of the at least one defective label.

As will be appreciated by one skilled in the art, aspects of the present disclosure may be embodied as a system, method, or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module", "system" or "sub-system." In addition, aspects of the present disclosure may take the form of a computer program product embodied in one or more computer readable medium(s) having computer readable program code embodied thereon.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain principles and practical applications thereof, and to thereby enable others skilled in the art to best utilize the various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims. The following claims are in no way intended to limit the scope of embodiments to the specific embodiments described herein.

What is claimed is:

1. A system comprising:

at least one reader configured to scan one or more labels;

at least one processor communicatively coupled to the at least one reader, wherein the at least one processor is configured to:

determine a grade value and encoded information associated with each of the one or more labels based at least on the scanning;

compare the determined grade value and the encoded information with a predefined threshold value associated with each of the one or more labels and the encoded information in each label with data intended to be encoded to each label of the one or more labels; and determine at least one defective label from the one or more labels, based on at least one of:

determining the grade value of at least one label is below the predefined threshold value, wherein the at least one label from the one or more labels is classified as the at least one defective label; and determining the encoded information of at least one label is mismatched with the data intended to be encoded to corresponding label, wherein the at least one label from the one or more labels is classified as the at least one defective label; and a light projector communicatively coupled to the at least one processor, wherein the light projector is configured to project one or more light patterns over the at least one defective label to highlight the at least one defective label to a user.

2. The system of claim 1, wherein the one or more labels correspond to machine-readable symbology labels or one or more radio frequency identification (RFID) labels.

3. The system of claim 1, wherein the grade value corresponds to a quality of each of the one or more labels based at least on a minimum reflectance, edge contrast, modulation, decode checks, defects, or decodability.

4. The system of claim 3, wherein the grade value is assigned between a scale of A-F based on the quality of each of the one or more labels, where A corresponds to a highest grade quality of label and F corresponds to a lowest grade quality of label.

5. The system of claim 1, wherein the one or more light patterns projected by the light projector reflects the determined grade value of the one or more labels or symbols signifying the at least one defective label.

6. The system of claim 1, wherein the light projector corresponds to at least one red green blue (RGB) light emitting diode (LED) strip.

7. The system of claim 6, wherein the at least one RGB LED strip is configured to adjust in at least one of a vertical direction or in a horizontal direction to project the one or more light patterns over the one or more labels based on shape and size of the one or more labels.

8. The system of claim 1, wherein the at least one reader corresponds to at least one radio frequency identification (RFID) reader.

9. The system of claim 1, wherein the light projector is configured to adjust to project the one or more light patterns over the one or more labels based on shape and size of the one or more labels.

10. The system of claim 1, wherein the at least one processor is configured to determine the grade value by selecting the grade value from a plurality of grade values, wherein the plurality of grade values comprise at least three different grade values.

11. A method comprising:

scanning, via at least one reader, one or more labels;

determining, via at least one processor, a grade value and encoded information associated with each of the one or more labels based at least on the scanning;

comparing, via the at least one processor, the determined grade value and the encoded information with a predefined threshold value associated with each of the one or more labels and the encoded information in each label with data intended to be encoded to each label of the one or more labels;

determining, via the at least one processor, at least one defective label from the one or more labels, based on at least one of:

determining the grade value of at least one label is below the predefined threshold value, wherein the at least one label from the one or more labels is classified as the at least one defective label; and determining the encoded information of at least one label is mismatched with the data intended to be encoded to corresponding label, wherein the at least one label from the one or more labels is classified as the at least one defective label; and projecting, via a light projector communicatively coupled to the at least one processor, one or more light patterns over the at least one defective label to highlight the at least one defective label to a user.

12. The method of claim 11, wherein the one or more labels correspond to machine-readable symbology labels or one or more radio frequency identification (RFID) labels.

13. The method of claim 11, wherein the grade value corresponds to a quality of each of the one or more labels based at least on a minimum reflectance, edge contrast, modulation, decode checks, defects, or decodability, and wherein the grade value is assigned between a scale of A-F based on the quality of each of the one or more labels, where A corresponds to a highest grade quality of label and F corresponds to a lowest grade quality of label.

14. The method of claim 11, wherein the ene-light projector corresponds to at least one red green blue (RGB) light emitting diode (LED) strip.

15. The method of claim 14, wherein the at least one RGB LED strip is configured to adjust in at least one of a vertical direction or in a horizontal direction to project the one or more light patterns over the one or more labels based on shape and size of the one or more labels.

16. A printer comprising:

a printer assembly for printing one or more labels;

at least one reader coupled, directly or indirectly, to the printer assembly, the at least one reader is configured to scan the one or more labels that are printed by the printer assembly to determine whether any of the one or more labels are defective;

at least one processor communicatively coupled to the at least one reader, wherein the at least one processor is configured to:

determine a grade value and encoded information associated with each of the one or more labels based at least on the scanning;

compare the determined grade value and the encoded information with a predefined threshold value associated with each of the one or more labels and the encoded information in each label with data intended to be encoded to each label of the one or more labels; and determine at least one defective label from the one or more labels, based on at least one of:

determining the grade value of at least one label is below the predefined threshold value, wherein the at least one label from the one or more labels is classified as the at least one defective label; and determining the encoded information of at least one label is mismatched with the data intended to be encoded to corresponding label, wherein the at least one label from the one or more labels is classified as the at least one defective label; and a light projector coupled, directly or indirectly, to the printer assembly, the light projector is configured to project one or more light patterns over the at least one defective label of the one or more labels.

*   *   *   *   *